United States Patent [19]

Murakami et al.

[11] Patent Number: 5,061,308

[45] Date of Patent: Oct. 29, 1991

[54] METHOD OF MANUFACTURING READILY MACHINABLE HIGH STRENGTH GLASS CERAMICS

[75] Inventors: Tadaki Murakami; Takasi Shirazawa, both of Amagasaki, Japan

[73] Assignee: Mitsubishi Denki Kabushiki Kaisha, Japan

[21] Appl. No.: 651,138

[22] Filed: Feb. 6, 1991

[30] Foreign Application Priority Data

Feb. 8, 1990 [JP] Japan ............................ 2-30253

[51] Int. Cl.$^5$ .................. C03C 10/04; C03C 10/16; C03B 29/00
[52] U.S. Cl. ............................ 65/18.4; 65/33; 501/3
[58] Field of Search .............. 65/18.1, 18.4, 33; 501/3

[56] References Cited

U.S. PATENT DOCUMENTS

| | | | |
|---|---|---|---|
| 3,462,252 | 8/1969 | Veres | 65/18.4 |
| 4,652,313 | 3/1981 | Grossman et al. | 501/3 |
| 4,767,725 | 8/1988 | Mizutani et al. | 501/3 |
| 4,783,429 | 11/1988 | Shibuya et al. | 501/3 |

FOREIGN PATENT DOCUMENTS 949401  3/1961  United Kingdom ............... 65/18.4

Primary Examiner—Richard V. Fisher
Assistant Examiner—John Hoffmann
Attorney, Agent, or Firm—Leydig Voit & Mayer

[57] ABSTRACT

A method of manufacturing readily machinable high strength glass ceramics includes the steps of: preparing a powder mixture by mixing glass powders ①  and ②, each having a predetermined composition, with each other; and producing a calcined product by granulating, molding, and heating the powder mixture. This method makes it possible to obtain readily machinable high strength glass ceramics of a novel composition, which exhibit a heat resistance of not less than 1000° C., which excel in mechanical strength and electrical insulation performance, and which allow precision machined parts and large-sized products to be produced with ease.

3 Claims, No Drawings

METHOD OF MANUFACTURING READILY MACHINABLE HIGH STRENGTH GLASS CERAMICS

BACKGROUND OF THE INVENTION

1. Field of the Invention

This invention relates to a method of manufacturing readily machinable high strength glass ceramics from which a product excelling in electrical insulation performance, heat resistance and mechanical strength and providing a precise size accuracy can be obtained with ease through machining. More specifically, this invention relates to a method of manufacturing readily machinable high strength glass ceramics which are valuable for use as materials for the heat-resistant insulating parts (e.g., substrates, carriers, etc.), the structure support members (e.g., coil bobbins, sensor supports, etc.), etc. of an electric/electronic apparatus, a precision mechanical apparatus, etc.

2. Description of the Related Art

Examples of known readily machinable ceramics include: the ceramic disclosed in Japanese Patent Laid-Open No. 63-50365 that is composed of mica powder and a $ZnO$-$SiO_2$-$B_2O_3$-type ceramic, the ceramic disclosed in Japanese Patent Publication No. 64-345 that is composed of mica powder and cordierite, and the ceramic obtained by precipitating mica crystals in glass, as shown in "Glass Handbook" (by Sumio Sakubana, Teruo Kyohno and Katsuaki Takahashi, published by Asakura Shoten, pp.215–216, 1982, the fifth impression).

The ceramic disclosed in Japanese Patent Laid-Open No. 63-50365 is prepared by heat-pressure-forming a mixture of mica powder and a $ZnO$-$SiO_2$-$B_2O_3$-type ceramic. This ceramic excels in electrical insulation performance and machinability and has a low thermal expansivity, so that it is used as a useful heat-resistant insulating material. Its critical heat-resistance temperature, however, is as low as approximately 800° C., so that its scope of use is inevitably limited. Supposedly, this is attributable to the fact that the melting point of the liquid phase substance generated in the $ZnO$-$SiO_2$-$B_2O_3$-type ceramic is around 800° C.

In the ceramic disclosed in Japanese Patent Publication No. 64-345, a cordierite ceramic is used instead of the $ZnO$-$SiO_2$-$B_2O_3$-type ceramic disclosed in Japanese Patent Laid-Open No. 63-50365. According to the description in Japanese Patent Publication (No. 64-345), a mold is filled with a mixture of mica powder and cordierite powder to pressure-form the mixture into a molding, which is then baked by heating it up to its calcining temperature (1200° to 1400° C.), thereby preparing the ceramic desired. It can be assumed from experiences up to the present time that the calcined product obtained by this method has the following problem:

As the calcining temperature is higher than the decomposition point of mica (around 1100° C.), it may be assumed that the mica suffers progressive thermal decomposition, with the result that the product machinability provided by the mica is deteriorated. Furthermore, the thermal decomposition is accompanied by the generation of gases such as fluorine. Thus, it can be assumed that the ceramic obtained is liable to be porous, which means it is not easy to prepare a compact product with this method.

The ceramic shown in the above-mentioned handbook, i.e., the one obtained by precipitating mica in glass, is the most excellent of the conventional ceramics known in terms of electrical insulation performance, precision machinability, etc. The mechanical strength it provides, however, is insufficient.

SUMMARY OF THE INVENTION

This invention has been made with a view to eliminating the above problems in the conventional ceramics (in terms of heat resistance, mechanical strength, etc.). It is accordingly the object of this invention to provide a method of manufacturing readily machinable high strength glass ceramics from which a product excelling in electrical insulation performance, heat resistance and mechanical strength and providing a precise size accuracy can be obtained with ease through machining.

In accordance with this invention, there is provided a method of manufacturing readily machinable high strength glass ceramics, comprising the steps of:

(A) preparing a powder mixture composed of 30 to 95% by weight of a glass powder ① and 5 to 70% by weight of a glass powder ②, the glass powder ① obtained by melting, at a heating temperature of 1400° to 1500° C., a glass that is produced by mixing materials in such a manner that the following composition is attained: 11.0 to 11.5% by weight of $K_2O$, 23.5 to 24.8% by weight of $MgO$, 55.0 to 56.8% by weight of $SiO_2$, 8.4 to 12.6% by weight of $F_2$, and 0.86 to 0.99% by weight of $ZrO_2$, and grinding the glass thus obtained, and the glass powder ② being obtained by melting, at a heating temperature of 1400° to 1500° C., a glass that is produced by mixing materials in such a manner that the following composition is attained: 5.0 to 6.0% by weight of $K_2O$, 9.5 to 11.0% by weight of $MgO$, 46.0 to 48.0% by weight of $SiO_2$, 21.0 to 23.0% by weight of $CaO$, 0.2 to 0.5% by weight of $CaF_2$, 5.0 to 6.5% by weight of $MgF_2$, and 8.0 to 8.5% by weight of $P_2O_5$;

(B) granulating the powder mixture thus prepared to obtain a granular material;

(C) filling a mold with the granular material to perform molding with a pressing force of not less than 200 $kg/cm^2$, thereby producing a molding; and (D) heating the molding at a temperature of 1050° to 1150° C., thereby obtaining a calcined product.

The manufacturing method of this invention makes it possible to obtain readily machinable high strength glass ceramics of a novel composition, which exhibit a heat resistance of not less than 1000° C., which excel in mechanical strength and electrical insulation performance, and which allow precision machined parts and large-sized products to be produced with ease.

DESCRIPTION OF THE PREFERRED EMBODIMENTS

In this invention, two types of glass powder, glass powder ① and glass powder ②, are prepared. In the following, "%" represents "weight %".

Glass powder ① has the following composition: 11.0 to 11.5% of $K_2O$, 23.5 to 24.8% of $MgO$, 55.0 to 56.8% of $SiO_2$, 8.4 to 12.6% of $F_2$, and 0.86 to 0.99% of $ZrO_2$. Materials containing these substances are mixed with each other so that this ratio of composition is attained and are put in a melting pot (e.g., a refractory pot or a platinum pot), where they are melted by heating at a temperature of 1400° to 1500° C. to produce a glass, which is ground into glass powder.

The materials to be mixed with each other to attain the above composition may include an oxide, a carbonate, a fluoride, etc.

Glass powder ② has the following composition: 5.0 to 6.0% of $K_2O$, 9.5 to 11.0% of MgO, 46.0 to 48.0% of $SiO_2$, 21.0 to 23.0% of CaO, 0.2 to 0.5% of $CaF_2$, 5.0 to 6.5% of $MgF_2$, and 8.0 to 8.5% of $P_2O_5$. Materials such as an oxide, a carbonate, a phosphate and a fluoride are mixed with each other so that this ratio of composition is attained and are put in a melting pot, where they are melted, as in the case of glass powder ①, by heating at a temperature of 1400° to 1500° C. to produce a glass, which is ground into glass powder.

In both glass powder ① and glass powder ②, any deviation from the above composition makes vitrification difficult, which means a desired uniform glass powder cannot be obtained.

The two types of glass powder thus obtained are mixed with each other in the proportion: 30 to 95% of glass powder ① and 5 to 70% of glass powder ② to prepare a powder mixture.

The reason for mixing the two types of glass powder in the above proportion is as follows:

Heating glass powder ① in the precipitation of crystals of fluorine phlogopite, magnesium/potassium fluoride, chondrodite, etc., and heating glass powder ② results in the precipitation of crystals of fluorine phlogopite, diopside, apatite, etc. When only glass powder ① is used, the product obtained has a heat resistance (critical thermal deformation temperature) of as high as not less than 1150° C. and is readily machinable. In this case, however, a large amount of fluorine phlogopite is precipitated as a result of heating, so that it is rather difficult to obtain a compact calcined product even when the baking conditions are adjusted. Using glass powder ② alone, on the other hand, results in progressive compactization taking place at a heating temperature of around 1000° C., a compact product being obtained at 1100° C. The product, however, contains much vitreous substance. Furthermore, the crystals precipitated include a relatively large amount of diopside crystals, so that the product has a high level of hardness, resulting in a poor machinability. Thus, with either type of glass powder alone, it is impossible to obtain the kind of glass ceramic this invention aims to realize. It is only by mixing them with each other in the proportion: 30 to 95% of glass powder ① and 5 to 70% of glass powder ② that a desired glass ceramic can be obtained. In other words, by interspersing glass powder ① with glass powder ② in the above proportion, the calcined product obtained from the powder mixture can be made compact, and, at the same time, a ceramic excelling in heat resistance, electrical insulation performance, mechanical strength, and machinability can be obtained.

It is desirable that both types of glass powder have an average of approximately 5 μm or less. A grain size larger than 5 μm will make it difficult for the melting reaction between the two types of glass powder to take place during heating. Further, with such a grain size, it is difficult to obtain a compact product, and the machinability is subject to variation.

Normally, added to 100 parts by weight of the powder mixture thus prepared is 5 to 10 parts by weight of an aqueous solution of an organic binder such as polyvinyl alcohol with a concentration of approximately 5 to 10%. The mixture is then granulated into particles having a grain size of 50 to 100 μm by means of a Spartanluser or the like. Then, a mold is filled with this granulated substance, preparing a molding with a pressing force of not less than 200 kg/cm².

If the pressing force is less than 200 kg/cm², the molding obtained exhibits a low degree of compactness, which means a compact calcined product cannot be obtained by heating it.

By heating the molding at a temperature of 1050° to 1150° C. to bake it into a calcined product, a glass ceramic is produced. If the temperature is lower than 1050° C., it is difficult to obtain a calcined product having a sufficient degree of compactness. In particular, the calcined product thus obtained is defective in terms of mechanical strength, electrical insulation performance, etc., so that it is undesirable. If the baking temperature is higher than 1150° C., large pores will be generated in the product and the crystals precipitated will be allowed to grow, with the result that the product becomes porous.

With this method, it is also possible to produce a thick glass ceramic whose thickness is not less than 30 mm. This is because of the random precipitation of a number of substances, including fluorine phlogopite, diopside, magnesium fluoride, potassium, chondrodite, and apatite. As a result, the ceramic obtained exhibits no directional property, so that it can be easily formed into a thick product whose thickness is not less than 30 mm. The glass ceramic obtained has a high heat-resistance temperature (critical deformation temperature) of 1000° to 1050° C., a mechanical strength (bending strength) of 1350 to 1950 kg/cm², an electrical insulation performance (volume resistivity) of approximately $1 \times 10^{15} \Omega \cdot cm$, and can be easily formed into precision machined parts by means of an ordinary machining equipment and a carbide tool.

The manufacturing method of this invention will be further described with reference to examples.

EXAMPLE 1

87.9 g of potassium silicofluoride, 110.3 g of potassium carbonate, 193.3 g of magnesium oxide, 56.8 g of magnesium fluoride, 10 g of zirconium oxide, and 551.7 g of silicic anhydride were mixed with each other and put in a melting pot, where they were melted by heating at a temperature of 1500° C. to produce a glass. The glass was then ground into glass powder ① having an average grain size of 5 μm. The composition of glass powder ① was as follows: 11.2% of $K_2O$, 23.6% of MgO, 55.1% of $SiO_2$, 9.2% of $F_2$, and 0.90% of $ZrO_2$.

Further, 131.7 g of ammonium phosphate, 105.2 g of magnesium oxide, 2.5 g of potassium fluoride, 52.8 g of magnesium fluoride, 479.6 g of silicic anhydride, 399.4 g of calcium carbonate, and 80.4 g of potassium carbonate were mixed with each other and put in a melting pot, where they were melted by heating at a temperature of 1500° C. to produce a glass. The glass was then ground into glass powder ② having an average grain size of 5 μm. The composition of glass powder ② was as follows: 5.5% of $K_2O$, 10.3% of MgO, 47.7% of $SiO_2$, 22.0% of CaO, 0.4% of $CaF_2$, 5.8% of $MgF_2$, and 8.3% of $P_2O_5$.

Glass powder ① and glass powder ②, thus obtained, were mixed with each other in a proportion by weight of 1/1. Added to 500 g of the mixture thus obtained was 500 g of ethanol. They were then subjected to wet blending in a ball mill for eight hours.

The mixture was then put in a stainless vat, where it was dried at a temperature of 60° to 70° C., thereby removing the ethanol therefrom.

250 g of the dried mixture was put in a Spartanluser (manufactured by Fuji Paudaru K.K.) and was granulated while adding 25 g of 5% aqueous solution of polyvinyl alcohol thereto.

The granulated substance obtained was dried at a temperature of 60° to 70° C. Then, a mold having a height of 50 mm, a width of 125 mm and a length of 125 mm was filled with this granulated substance to perform molding with a pressing force of 1 ton/cm². Then, the molding thus obtained was put in a baking furnace, where the temperature was raised from room temperature up to 550° C. at a rate of 5° C./min to maintain the temperature at this level for three hours. Then, the temperature was raised at a rate of 10° C./min up to 1100° C., which was maintained for three hours. Afterwards, the heat source was turned off to allow the molding to cool down by self-cooling and a calcined product was extracted.

The properties of the calcined product obtained were measured as follows:

The water absorption was measured using as a specimen a piece which was cut from the calcined product and which had a thickness of 10 mm, a width of 10 mm, and a length of 20 mm. The measurement was performed by immersing the specimen in boiling water for three hours.

The mechanical strength was measured using as a specimen a piece which was cut from the calcined product and which had a thickness of 3 mm, a width of 4 mm, and a length of 50 mm. The measurement of the bending strength was performed by using an Autograph manufactured by Shimazu Seisakusho K.K. with a distance between supporting points of 25 mm and at a crosshead speed of 0.5 mm/min.

The electrical insulation performance was measured using as a specimen a piece which was cut from the calcined product and which had a thickness of 2 mm and a diameter of 50 mm. The measurement of the volume resistivity under the ordinary state was performed in accordance with JIS C 2141, Section 11.1.

The heat resistance was measured using as a specimen a piece which was cut from the calcined product and which had a thickness of 1 mm, a width of 5 mm, and a length of 5 mm. The measurement of the critical deformation temperature, which causes the specimen to start to soften and contract, was performed by using a thermomechanical analysis apparatus (TMA) manufactured by Shimazu Seisakusho K.K.

The hardness was measured by a Shore hardness tester using as a specimen a piece prepared from the calcined product and having a thickness of 2 mm, a width of 30 mm, and a length of 30 mm.

The machinability was measured using as a specimen a piece which was cut from the calcined product and which had a thickness of 5 mm, a width of 50 mm, and a length of 50 mm. Its machinability was judged by observing the conditions of through-holes made in the piece by means of a drilling machine and carbide drills (K-10) having respective drill diameters of 0.2, 0.5, 1.0, 3.0 and 5.0 mm$\phi$.

The judgment was made in accordance with the following criteria: unmachinable: one not allowing formation of through-holes; machinable: one allowing formation of through-holes but involving broken portions around them; and well machinable: one allowing smooth formation of through-holes and not involving defects such as broken portions. The observation of the through-holes was performed by using a microscope of 5 to 30 magnifications. The results are shown in the accompanying table.

EXAMPLE 2 glass powder ① and glass powder ② obtained in Example 1 were mixed with each other in a proportion by weight of 95/5. A molding was prepared from this mixture in the same manner as in Example 1 and was put in a baking furnace, where the temperature was raised from room temperature up to 550° C. at a rate of 5° C./min to maintain the temperature at this level for three hours. Then, the temperature was raised at a rate of 10° C./min up to 1150° C., which was maintained for three hours. Afterwards, the heat source was turned off to allow the molding to cool down by self-cooling, and a calcined product was extracted.

The properties of the calcined product obtained were measured in the same manner as in Example 1. The results are shown in the accompanying table.

EXAMPLE 3

Glass powder ① and glass powder ② obtained in Example 1 were mixed with each other in a proportion by weight of 30/70. A molding was prepared from this mixture in the same manner as in Example 1 and was put in a baking furnace, where the temperature was raised from room temperature up to 550° C. at a rate of 5° C./min to maintain the temperature at this level for three hours. Then, the temperature was raised at a rate of 10° C./min up to 1050° C., which was maintained for three hours. Afterwards, the heat source was turned off to allow the molding to cool down by self-cooling, and a calcined product was extracted.

The properties of the calcined product obtained were measured in the same manner as in Example 1. The results are shown in the accompanying table.

EXAMPLE 4

4160 g of the granulated substance obtained in Example 1 was put in a mold having a height of 200 mm, a width of 200 mm, and a length of 200 mm to perform molding with a pressing force of 200 kg/cm², thereby obtaining a molding having a thickness of approximately 50 mm, a width of 200 mm, and a length of 200 mm.

The molding was put in a baking furnace, where the temperature was raised from room temperature up to 550° C. at a rate of 2.5° C./min to maintain the temperature at this level for five hours. Then, the temperature was raised at a rate of 5° C./min up to 1050° C., effecting a temperature retention of one hour at 800° C., 900° C., 1000° C., and 1050° C.. Afterwards, the heat source was turned off to allow the molding to cool down by self-cooling. What was obtained was a contracted calcined product which had a thickness of approximately 40 mm, a width of approximately 160 mm, and a length of 160 mm.

The properties of the calcined product obtained were measured in the same manner as in Example 1. The results are shown in the accompanying table.

COMPARATIVE EXAMPLE 1

A calcined product was prepared in the same manner as in Example 2 by using only glass powder ① obtained in Example 1. The properties of the calcined product obtained were measured in the same manner as in Example 1. The results are shown in the accompanying table.

The calcined product obtained was not likely to provide a sufficient level of compactness. It exhibited a low level of mechanical strength, with its water absorption being low and its electrical insulation performance being poor.

COMPARATIVE EXAMPLE 2

A calcined product was prepared in the same manner as in Example 3 by using only glass powder ② obtained in Example 1. The properties of the calcined product obtained were measured in the same manner as in Example 1. The results are shown in the accompanying table.

The calcined product obtained exhibited a low level of mechanical strength.

COMPARATIVE EXAMPLE 3

A machinable ceramic (manufactured by Ryoden Kasei K.K.) corresponding to the myoceram disclosed in Japanese Patent Laid-Open No. 63-50365 was purchased to perform measurement in the same manner as in Example 1. The results are shown in the accompanying table.

The heat resistance temperature (critical thermal deformation temperature) calcined product was 800° C., which is lower than that in the method of this invention.

COMPARATIVE EXAMPLE 4

A machinable ceramic (manufactured by Ishihara Yakuhin K.K.) corresponding to the macohl disclosed in the above-mentioned glass handbook was purchased to perform measurement in the same manner as in Example 1. The results are shown in the accompanying table.

The bending strength of the calcined product was 1000 kg/cm$^2$, which is lower than that in the method of this invention.

As can be seen from the table, the glass ceramics obtained by the manufacturing method of this invention exhibit a high heat resistance (critical thermal decomposition temperature) of not less than 1000° C. and a high mechanical strength (bending strength) of not less than 1350 kg/cm$^2$. It will also be appreciated that they are glass ceramics materials which excel in electrical insulation performance and machinability.

Further, as can be seen from the results of Example 4, they allow thick products to be manufactured with ease.

Thus, in accordance with this invention, glass ceramics excelling in heat resistance, mechanical strength, and machinability can be obtained. These glass ceramics have a range of use wider than that for conventional ceramics. They can be used, for example, as heat-resistant insulating support members for vehicles, arc-extinguishing members, heat insulating materials, etc.

What is claimed is:

1. A method of manufacturing readily machinable high strength glass ceramics, comprising the steps of:
   (A) preparing a powder mixture composed of 30 to 95% by weight of a glass powder ① and 5 to 70% by weight of a glass powder ②, said glass powder ① being obtained by melting, at a first heating temperature between 1400° and 1500° C., a glass that is produced by mixing materials in such a manner that the following composition is attained: 11.0 to 11.5% by weight of $K_2O$, 23.5 to 24.8% by weight of MgO, 55.0 to 56.8% by weight of $SiO_2$, 8.4 to 12.6% by weight of $F_2$, and 0.86 to 0.99% by weight of $ZrO_2$, and grinding the glass thus obtained, and said glass powder ② being obtained by melting, at a second heating temperature between 1400° and 1500° C., a glass that is produced by mixing materials in such a manner that the following composition is attained: 5.0 to 6.0% by weight of $K_2O$, 9.5 to 11.0% by weight of MgO, 46.0 to 48.0% by weight of $SiO_2$, 21.0 to 23.0% by weight of CaO, 0.2 to 0.5% by weight of $CaF_2$, 5.0 to 6.5% by weight of $MgF_2$, and 8.0 to 8.5% by weight of $P_2O_5$;
   (B) granulating said powder mixture thus prepared to obtain a granular material;

TABLE

| Example | 1 | 2 | 3 | 4 | Comp. Ex. 1 | Comp. Ex. 2 | Comp. Ex. 3 | Comp. Ex. 4 |
|---|---|---|---|---|---|---|---|---|
| Composition (%) | | | | | | | | |
| Glass Powder ① | 50 | 95 | 30 | 50 | 100 | — | — | — |
| Glass Powder ② | 50 | 5 | 70 | 50 | — | 100 | — | — |
| Pressing force (kg/cm$^2$) | 1000 | 1000 | 1000 | 200 | — | — | — | — |
| Baking temperature (°C.) | 1100 | 1150 | 1050 | 1100 | 1150 | 1050 | — | — |
| Properties | | | | | | | | |
| Water absorption (%) | 0.0 | 0.0 | 0.0 | 0.0 | 0.8 | 0.0 | 0.0 | 0.0 |
| Bending strength (kg/cm$^2$) | 1950 | 1350 | 1850 | 1900 | 750 | 1100 | 1000 | 1000 |
| Volume resistivity (Ω · cm) | $1 \times 10^{15}$ | $1 \times 10^{15}$ | $1 \times 10^{15}$ | $1 \times 10^{15}$ | $1 \times 10^{13}$ | $1 \times 10^{15}$ | $1 \times 10^{14}$ | $1 \times 10^{15}$ |
| Critical thermal decomposition temperature (°C.) | 1000 | 1050 | 1000 | 1000 | 1050 | 1000 | 800 | 1000 |
| Shore hardness | 70 | 60 | 80 | 70 | 45 | 120 | 85 | 80 |
| Machinability | Good | Good | Good | Good | Good | Bad | Good | Good |

(C) filling a mold with said granular material and pressing it to with a pressing force of not less than 200 kg/cm$^2$, thereby producing a molding; and
   (D) heating said molding to a temperature between 105020 and 1150° C., thereby obtaining a calcined product, which is a high strength glass ceramic.

2. A method as claimed in claim 1 wherein the average grain size of said glass powder ① and said glass powder ② is not larger than approximately 5 μm.

3. A method as claimed in claim 1 wherein said powder mixture is granulated into a granular material whose grain size is approximately 100 μm.

* * * * *

UNITED STATES PATENT AND TRADEMARK OFFICE
CERTIFICATE OF CORRECTION

PATENT NO. : 5,061,308

DATED : October 29, 1991

INVENTOR(S) : Murakami et al

It is certified that error appears in the above-identified patent and that said Letters Patent is hereby corrected as shown below:

Column 8, line 58, change "105020" to --1050°--.

Signed and Sealed this

Second Day of March, 1993

Attest:

STEPHEN G. KUNIN

*Attesting Officer*   Acting Commissioner of Patents and Trademarks